United States Patent
Yapi et al.

(10) Patent No.: US 12,151,804 B2
(45) Date of Patent: Nov. 26, 2024

(54) ACTUATOR CONTROL FOR FORCE FIGHT MITIGATION

(71) Applicant: Goodrich Actuation Systems SAS, Saint Ouen l'Aumone (FR)

(72) Inventors: Lionel Yapi, Le Chesnay (FR); Diarmaid Hogan, Cork (IE); Laura Albiol-Tendillo, Valls (ES)

(73) Assignee: GOODRICH ACTUATION SYSTEMS SAS, Saint Ouen l'Aumone (FR)

( * ) Notice: Subject to any disclaimer, the term of this patent is extended or adjusted under 35 U.S.C. 154(b) by 355 days.

(21) Appl. No.: 17/577,439

(22) Filed: Jan. 18, 2022

(65) Prior Publication Data

US 2022/0227482 A1 Jul. 21, 2022

(30) Foreign Application Priority Data

Jan. 18, 2021 (EP) ..................................... 21305053

(51) Int. Cl.
*B64C 13/50* (2006.01)

(52) U.S. Cl.
CPC .......... *B64C 13/503* (2013.01); *B64C 13/504* (2018.01)

(58) Field of Classification Search
CPC ....... B64C 13/16; B64C 13/50; B64C 13/503; B64C 13/504; B64C 13/505
USPC ...................................................... 244/198
See application file for complete search history.

(56) References Cited

U.S. PATENT DOCUMENTS

| | | | | |
|---|---|---|---|---|
| 4,800,798 A | * | 1/1989 | Boldrin | F15B 18/00 416/114 |
| 5,121,042 A | * | 6/1992 | Ako | F15B 9/03 318/632 |
| 5,129,310 A | * | 7/1992 | Ma | G05D 3/14 91/171 |
| 5,806,805 A | | 9/1998 | Elbert et al. | |

(Continued)

FOREIGN PATENT DOCUMENTS

| | | | | |
|---|---|---|---|---|
| CN | 109582033 A | | 4/2019 | |
| DE | 102016014974 A1 | * | 6/2018 | ............. B64C 13/00 |
| FR | 2983456 A1 | * | 6/2013 | ........... B64C 13/503 |

OTHER PUBLICATIONS

Abstract for DE102016014974, 1 page.

(Continued)

*Primary Examiner* — Brady W Frazier
(74) *Attorney, Agent, or Firm* — CANTOR COLBURN LLP

(57) ABSTRACT

A system and method for controlling two or more actuators acting together to move a component or surface includes Two or more actuators engaged with the component or surface to be moved. Each actuator is displaceable to move the component or surface in response to a component or surface position command. Each actuator has an associated actuator controller to receive the position command and to output an actuator displacement command. The system also includes force fight control means configured to determine a force differential from forces, or a pressure differential from pressures measured at each actuator and to derive a speed and/or a current offset signal, and to provide the offset signal to the actuator controllers to modify the actuator displacement commands.

10 Claims, 4 Drawing Sheets

(56) References Cited

U.S. PATENT DOCUMENTS

| | | | |
|---|---|---|---|
| 6,446,911 B1* | 9/2002 | Yount | G05D 1/0077 |
| | | | 701/4 |
| 7,104,053 B2 | 9/2006 | Gast | |
| 8,245,967 B2 | 8/2012 | Kirkland | |
| 8,583,293 B2 | 11/2013 | Soronda | |
| 9,117,579 B2* | 8/2015 | Matsui | B64C 13/16 |
| 10,479,484 B2 | 11/2019 | Huynh et al. | |
| 10,570,936 B2 | 2/2020 | Hussey | |
| 10,759,519 B2 | 9/2020 | Blanding et al. | |
| 2003/0127569 A1* | 7/2003 | Bacon | B64C 13/505 |
| | | | 244/195 |
| 2010/0127132 A1 | 5/2010 | Kirkland | |
| 2011/0108671 A1* | 5/2011 | Soronda | B64C 13/503 |
| | | | 244/195 |
| 2018/0362147 A1* | 12/2018 | Huynh | B64C 9/20 |
| 2019/0234813 A1 | 8/2019 | Fox et al. | |
| 2020/0140064 A1 | 5/2020 | Liscouet et al. | |

OTHER PUBLICATIONS

Abstract of CN109582033, 1 Page.
European Search Report for Application No. 21305053.7, mailed Jul. 1, 2021, 8 pages.
Abstract of FR2983456, 1 Page.

\* cited by examiner

ACTUATOR CONTROL FOR FORCE FIGHT MITIGATION

CROSS-REFERENCE TO RELATED APPLICATIONS

This application claims priority to European Patent Application No. 21305053.7 filed Jan. 18, 2021, the entire contents of which is incorporated herein by reference.

TECHNICAL FIELD

The present disclosure relates to the field of actuator control and, in particular, the field of mitigating force fight in actuator control systems such as employed in aircraft flight control systems.

BACKGROUND

Actuators are used in various fields for moving components or surfaces. In aircraft, for example, flight control surfaces such as wing flaps, ailerons, elevators, rudders, etc. are moved by means of actuators in response to a command from the flight control computer or from a manual control e.g. operation of a control device by the pilot or crew. Similar actuation systems may be used in other fields such as in other vehicles or industrial uses. Often, e.g. where the component or surface to be moved is large or heavy, or where it is necessary to build in redundancy in the event of failure of an actuator, two or more actuators may be coupled to a single component or surface to be moved. This is the case, for example, in safety-critical applications such as actuation systems for primary flight controls of aircraft. In some systems, only one actuator will be active at a time, and the other(s) is on standby until needed. In other systems, both/all actuators may be active at the same time. The actuators in such active/active systems work together to position the surface based on commands which are used to provide respective position references to the individual actuator controllers which move the actuator positioning element to achieve the desired position. A feedback system is provided that senses the actuator or component/surface position and compares this with the desired position and the control signal is adjusted accordingly. Active/active systems improve system redundancy. Whilst, in theory, control commands will be provided to the actuators so that they work simultaneously to provide a balanced movement to the component or surface, in practice, due to differences in sensor tolerances, actuator or surface mechanical tolerances, signal disturbances/dissynchrony, load imbalance etc. force fighting can occur between the actuators. Force fighting can lead to wear or damage of the actuation system parts.

Conventionally, systems have had to be designed to be oversized or overrated to better be able to handle the stresses of force fighting and mitigate the wear or damage. This results in the design of the actuators being bigger and heavier than actually needed for the movement required.

Other solutions, aimed at mitigating force fighting between actuators, involve using a force fighting control process. Such processes generally operate by measuring the relative force or pressure on the actuators and to use the measurement to generate an offset in the position control commands sent to the respective actuators so as to equalize the load share on the actuators. In aircraft, actuators have traditionally been hydraulic actuators. Force fighting mitigation processes have involved measuring the differences in pressure of the actuators and using the pressure differential as part of a regulation scheme to offset the position references or commands being provided to each actuator so as to equalize the load share.

In aircraft, there is a trend towards More Electric Aircraft (MEA) or All Electric Aircraft (AEA) in which hydraulic systems are being replaced by smaller, lighter electrical systems. As part of this development, aircraft designers are now using electromechanical actuators (EMAs) in place of hydraulic actuators. Similar force fighting reduction schemes have been developed for EMAs using a force measurement from each EMA and using this is a position control loop to equalize load share. Other systems employ electro-hydraulic actuators (EHAs) which use local electrical motor drives to manage hydraulic pressure in the EHA to move the EHA piston.

While such force fighting controls schemes have proven effective, the response of the control can be fairly slow. Further, with EMAs the actuators can jam due to failure of the mechanical power transmission components. There is, therefore, a need for an improved force fighting mitigation control.

SUMMARY

According to the disclosure, there is provided a system for controlling two or more actuators acting together to move a component or surface. The system includes two or more actuators engaged with the component or surface to be moved. Each actuator is displaceable to move the component or surface in response to a component or surface position command, and has an associated actuator controller to receive the position command and to output an actuator displacement command. The system also includes force fight control means configured to determine a force differential from forces, or a pressure differential from pressures measured at each actuator and to derive a speed and/or a current offset signal, and to provide the offset signal to the actuator controllers to modify the actuator displacement commands.

Where the actuators are EMAs, forces are measured. In the case of EHAs, pressure measurements are used to generate the speed/current offset signal.

According to another aspect, there is provided a method of controlling two or more actuators acting together to move a component or surface, the method comprising: receiving a position command and outputting an actuator displacement command responsive to the position command; and determining a force differential from forces, or a pressure differential from pressures measured at each actuator to derive a speed and/or a current offset signal, and using the offset signal to modify the actuator displacement command to mitigate force fighting between the actuators.

BRIEF DESCRIPTION OF THE DRAWINGS

Preferred embodiments will now be described by way of example only, with reference to the drawings in which.

DETAILED DESCRIPTION

To simplify explanation of the system of this disclosure, known control schemes will first be briefly described with reference to FIGS. 1 to 3.

Figure 1:
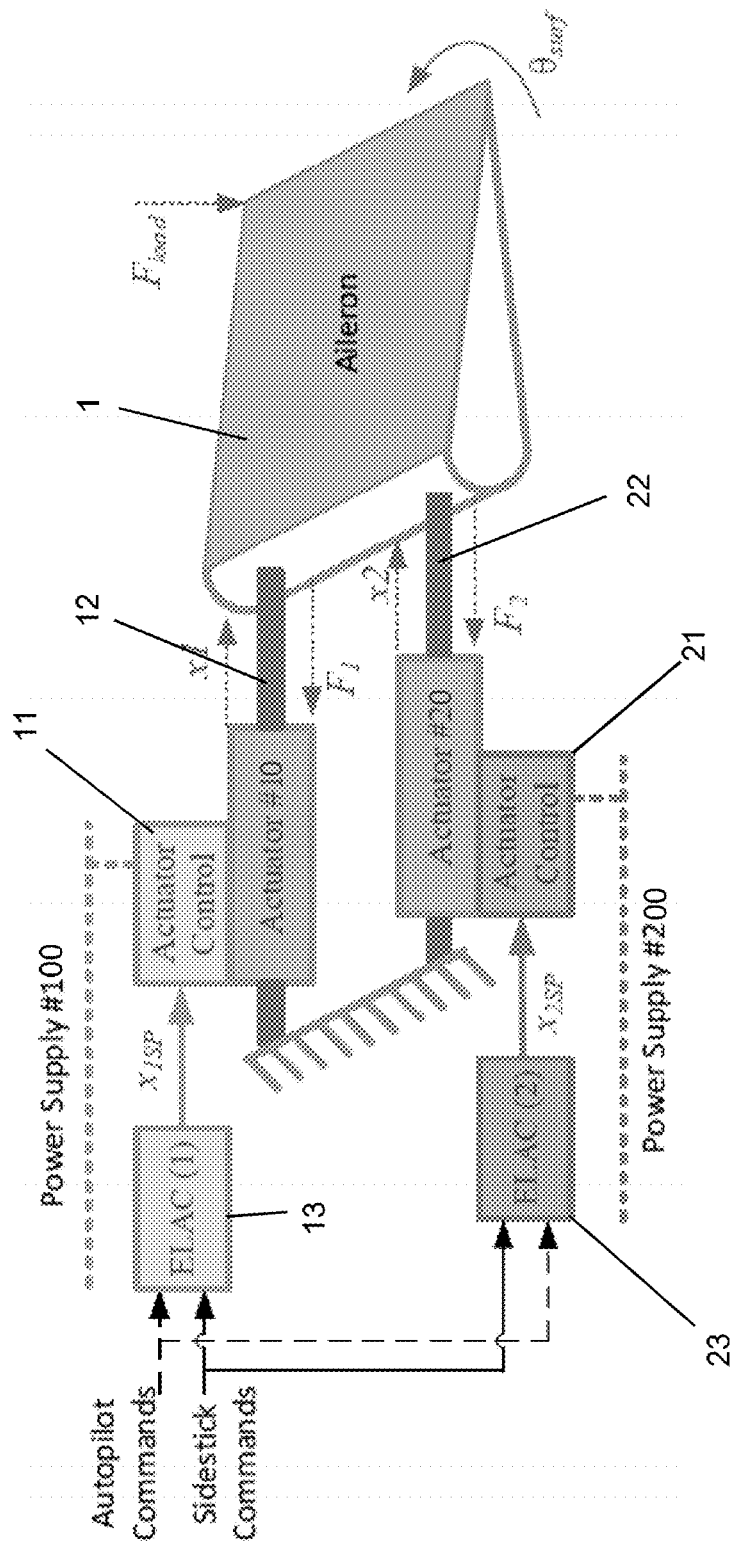
FIG. 1 shows the configuration of a known active-active actuator control system for an aircraft flight surface control.
Figure 2:
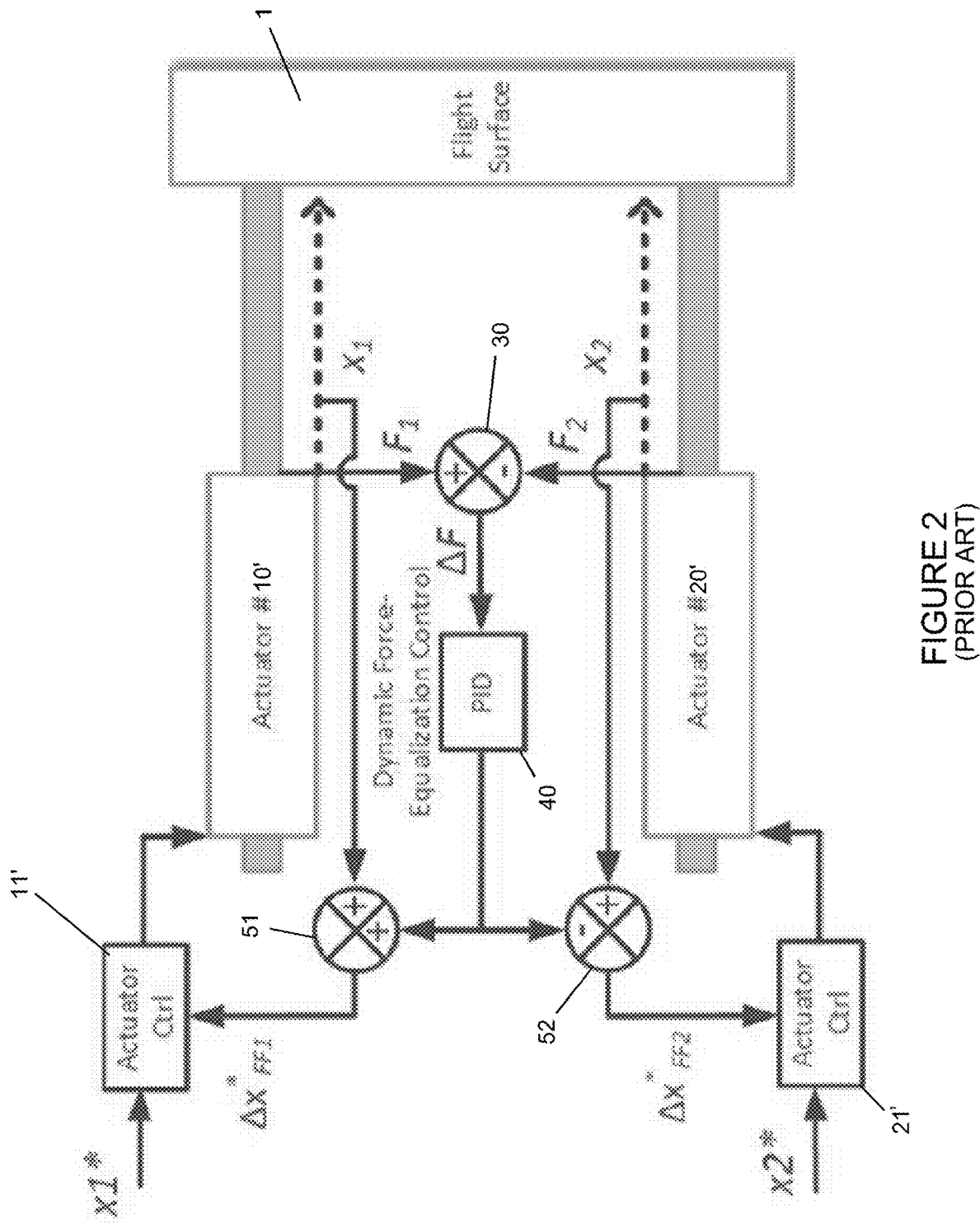
FIG. 2 shows a known position-based force fighting mitigation system.

Referring first to FIG. 1, a dual actuator position control system is shown. In this example, the surface 1 to be moved by the actuators 10, 20 is a flight control of an aircraft, or other movable surface of an aircraft, such as an aileron. This is one example, only, of the type of application of the system of this disclosure, and the system of the disclosure may find application in moving other components or surface in aircraft or in other fields, requiring active-active actuation of a component.

The surface 1 is controlled by two actuators 10, 20, in active mode, acting in parallel. Of course, other numbers of actuators may be used and the disclosure is not limited only to control of two actuators. Also, the actuators shown are hydraulic actuators, but the disclosure may also apply to other types of actuator e.g. EMAs or electro-hydraulic actuators. Each actuator 10, 20 has an associated actuator controller 11, 21 which is responsible to moving the actuator rod or jack 12, 22 to cause resultant movement of the surface 1, to which the jacks are attached. The actuator controls 11, 21 each receive a respective position command or position reference X1SP, X2SP defining the desired position of the respective jack 12, 22 to result in the desired position of the surface 1. The position references are generated by the flight surface computer(s) 13, 23 (here Elevator and Aileron Computers ELAC). In the example shown, two computers 13, 23 are provided, one receiving commands from an autopilot, the other receiving manual commands from the pilot or crew e.g. by operation of a sidestick or lever. In other examples, the position references may be provided by a single computer or processor responsive to an input control command indicative of the desired position of the component or surface to be moved. The actuator controls 11, 21 may have dedicated or common/shared power supplies 100, 200. In response to input commands e.g. autopilot and/or sidestick commands, the computer(s) 13, 23 will generate position references X1SP, X2SP For the actuators, the position references provided to the actuator controls 11, 21 which cause the actuator jacks 12, 22 to move to position x1, x2. This causes corresponding movement (here rotation θSURF) of the surface. The actuator controllers 11, 21 will mitigate any disturbances resulting from e.g. the aerodynamic load Fload.

As mentioned in the Background, duel or multiple actuator control systems can result in force fighting i.e. unequal loads on the actuators. FIG. 2 shows a conventional approach to force fighting mitigation as described above.

The force F1, F2 on each actuator 10' 20' is provided to a summer 30 which determines the force differential ΔF. This is fed to a PID controller 40. The output of the PID controller provides an adjustment to the fed-back position signal X1, X2 at summers 51, 52 to provide respective offsets to the actuators controls 11', 21' which then produce correspondingly adjusted position references for the actuators 10', 20'.

As mentioned above, such force fighting mitigation schemes are effective but do not completely eliminate force fighting and have a delayed response.

Figure 3:
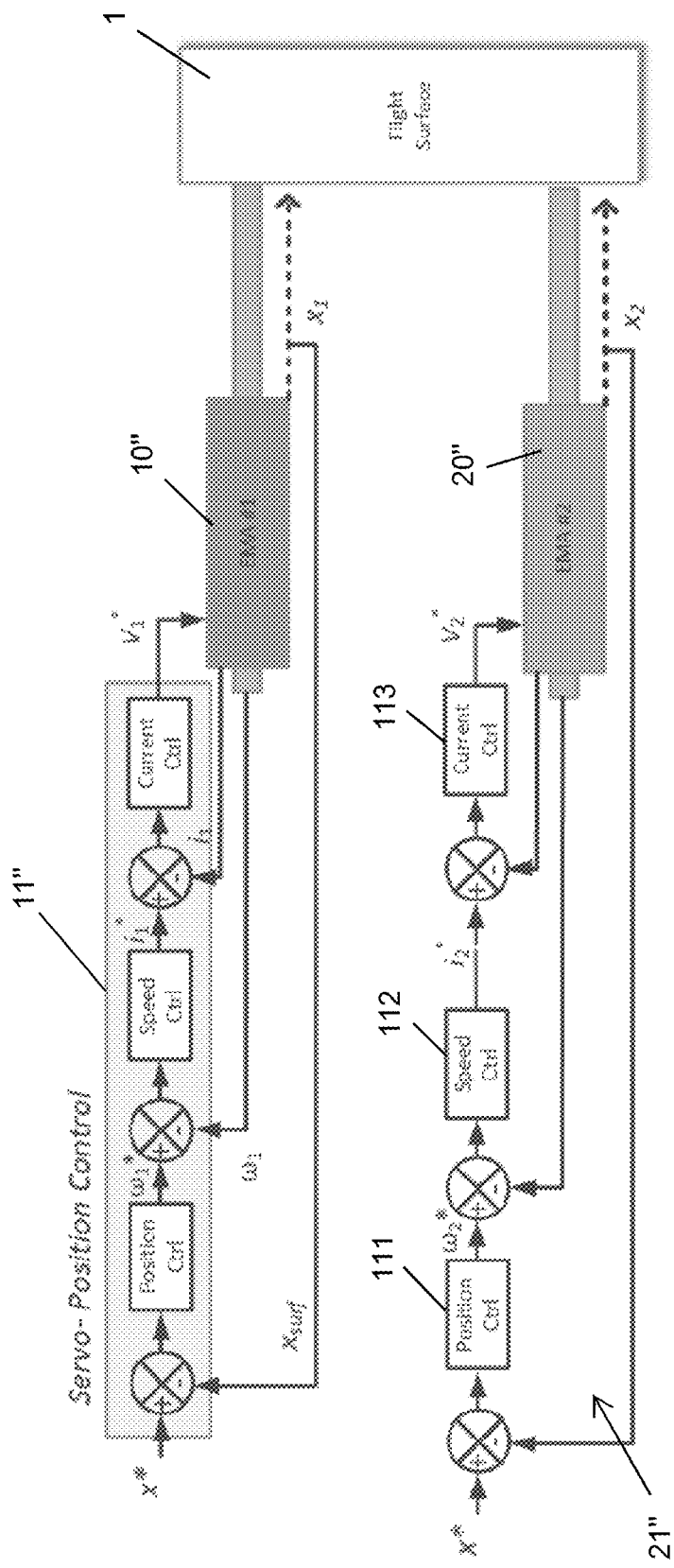
FIG. 3 shows a conventional cascaded position control system.

FIG. 3 shows a control system and dynamic force equalization control for a dual EMA position control system. The EMAs 10", 20" each have an actuator position control 11", 21" for regulating the position X1, X2 of the EMA based on the input position reference and the fed-back position Xsurf as described briefly above. The actuator position controls can be separate units for each actuator or can be a single unit configured to provide separate control signals to the respective actuators. For EMAs, the actuator controller 11", 21" is a servo-position control having a position control 111, speed control 112 and current control 113. The controller controls operation of the EMA, in response to the position reference, adjusted based on position, speed and current feedback, outputting a control voltage V1, V2 for each EMA. In more detail, the position signal is fed back to the position control 111 which generates a position control signal ω1 to the speed control 112, this generates a current control signal i1 to the current control 113 which outputs the voltage command reference V1 for the EMA motor drive (not shown here as a separate component).

The present disclosure modifies the known force fighting mitigation scheme described above with particular reference to FIG. 2, but also such that it can be incorporated into the control of an EMA system such as described above with reference to FIG. 3.

The modified force fighting mitigation control will be described now specifically for EMA systems such as shown in FIG. 3. It should be noted, however, that the principles of the modified control can also be applied to hydraulic or other actuator systems such as shown in FIG. 1.

As discussed above, conventional force fighting mitigation control schemes are based on measuring the difference in actuator linear position and generating a position offset reference to offset the position to alleviate load imbalance. This is conventionally done by a centralised PID control as described with reference to FIG. 3.

In particular with servo-position controllers as described above, for use with EMAs, using the position control means that the system might not react quickly to force fighting. As can be seen from FIG. 3, the position control is the outermost loop of the control scheme and will have the lowest bandwidth of the three controls (111, 112, 113) in the actuator controller. This limits the speed with which the loop could react to a force fighting mitigation command. Whilst the impact of this is greater for EMA systems, using position control for force fighting mitigation also has disadvantages in conventional hydraulic systems such as described in relation to FIGS. 1 and 2.

The system of the present disclosure improves on conventional force fighting mitigation control by using the force or pressure differential, ΔF, between the actuators, to generate a speed offset and/or a current offset to generate an offset speed and/or current reference for each actuator rather than using the force differential to generate a position offset and provide an offset position reference.

In other words, the system controls the motor drive to facilitate position control of the actuator by regulating the motor speed (and/or current), thus controlling the motor angle and actuator position via gearing of the mechanical system, via control of the output voltage of the power converter.

Figure 4:
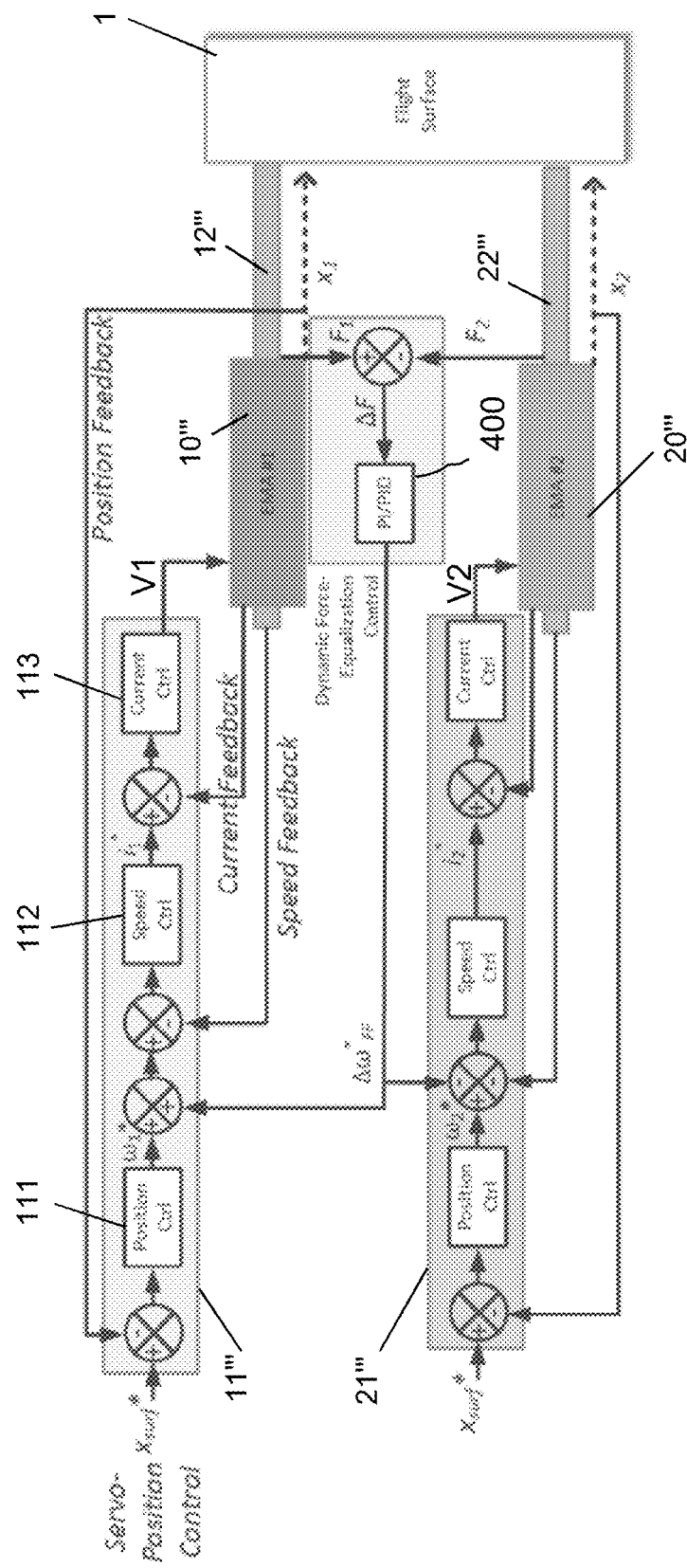
FIG. 4 shows a control system according to the disclosure.

An example of this modified control will be described with reference to FIG. 4 for EMA actuators.

As described above, two EMA actuators 10''', 20''' are attached to the surface 1 to be moved. A position command (not shown in FIG. 4) from the computer/user input is provided to each actuator controller 11''', 21''' to provide a respective control command to set the respective position X1, X2 of the respective EMA jack 12''', 22'''. As is conventional, actuator position, speed and current are fed back to the controller 11''', 21''', to the position controller 111, speed controller 112 and current controller 113, to provide positioning according to the position command.

Force fighting mitigation, according to the disclosure, as provided as follows. The load force of each actuator F1, F2 is measured and a force differential ΔF is determined and provided to a feedback controller which may be, for example, a PID controller 400. The feedback controller 400 generates, from the force differential, ΔF, a speed setpoint offset signal ΔωFF which is used by the speed controller 112 to offset the speed reference ω1, ω2 to generate the current reference i1, i2 which is used by the current controller 113 to generate the command voltage V1, V2.

The cascaded approach of position control, speed control, current control is just one example of a motor drive control scheme that can be used to modify a reference as generated by the force fight control system. Other techniques could be used e.g. model predictive schemes.

In an alternative example, instead of the PID 400 using the force differential to generate a speed setpoint offset, it generates a current setpoint offset (not shown). In other embodiments, the PID can generate both a speed and a current setpoint offset to adjust the command voltage.

In examples using hydraulic actuators or EHAs, the output force of actuator pressure is measured and used to generate a speed offset which is used to adjust the actuator controller outputs to balance the loads, rather than generating a position offset.

Using speed and/or current rather than position offsets in an inner control loop improves the rate of response of the system to force fighting. The current loop is tuned for the highest bandwidth due to the current time constants being in the millisecond range. The speed time constant is in the range of 10s or 100s of milliseconds. These inner control loops therefore respond faster than the outer position control loop. Also, since the force fighting performance is improved, the need to oversize or overrate the actuators is reduced, meaning the control systems can be smaller and lighter.

The control scheme can be integrated as part of a prognostics and health management strategy to monitor system loads and to flag up potential issues based on maximum loading.

The invention claimed is:

1. A system for controlling two or more actuators acting together to move a component or surface, the system comprising:
   two or more actuators engaged with the component or surface to be moved,
      each actuator being displaceable to move the component or surface in response to a component or surface position command,
      each actuator having an associated actuator controller to receive the position command and to output an actuator displacement command;
   force fight control means configured to determine a force differential from forces measured at each actuator and to derive a speed offset signal, and to provide the offset signal to the actuator controllers to modify the actuator displacement commands;
   wherein the force fight control means includes:
      means for measuring the force at each actuator and for determining a force differential between the forces at different actuators; and
      a feedback controller to generate, from the force differential, a speed setpoint offset signal;
   wherein the system further comprises:
      a speed control means configured to generate a current reference signal based on the speed setpoint offset signal.

2. The system of claim 1, wherein the actuators are electro based on the magnetic actuators, and wherein the force fight control means is configured to determine a force differential from forces measured at each actuator to derive the offset signal.

3. The system of claim 1, wherein the actuators are electro-hydraulic actuators, and wherein the force fight control means is configured to determine a pressure differential from pressures measured at each actuator to derive the offset signal.

4. The system of claim 1, wherein each actuator controller comprises a position control and a current control configured such that the actuator controller controls operation of the respective actuator in response to the position command adjusted based on position, speed and current feedback to output a control voltage for the actuator.

5. The system of claim 1, wherein the feedback controller is a proportional integral derivative (PID), controller.

6. The system of claim 1, wherein the component or surface is a moveable surface of an aircraft.

7. The system of claim 6, wherein the surface is a flight control surface.

8. A method of controlling two or more actuators acting together to move a component or surface, the method comprising:
   receiving a position command and outputting an actuator displacement command responsive to the position command; and
   determining with a force fight control means a force differential from forces measured at each actuator to derive a speed offset signal, and using the offset signal to modify the actuator displacement command to mitigate force fighting between the actuators;
   wherein determining the force differential includes measuring the force at each actuator and for determining a force differential between the forces at different actuators;
   generating with a feedback controller from the force differential, a speed setpoint offset signal;
   wherein force fight means includes a speed control means configured to generate a current reference signal.

9. The method of claim 8, wherein the actuators act together to move a flight control surface of an aircraft.

10. A moveable surface of an aircraft having mounted thereon a system as claimed in claim 1.

* * * * *